No. 12,386. REISSUED AUG. 29, 1905.

M. HOUSHOLDER.

LAVATORY OR SHAMPOOING BOWL.

APPLICATION FILED AUG. 1, 1904.

2 SHEETS—SHEET 1.

Witnesses:
Robert H. Weil
O. J. Blunthee

Inventor:
Minnie Householder
By John S. H. Weil Atty.

ANDREW. B. GRAHAM CO., PHOTO-LITHOGRAPHERS, WASHINGTON, D. C.

No. 12,386. REISSUED AUG. 29, 1905.

M. HOUSHOLDER.

LAVATORY OR SHAMPOOING BOWL.

APPLICATION FILED AUG. 1, 1904.

2 SHEETS—SHEET 2.

Witnesses:
Robert H. Weir
C. F. Blumtree

Inventor:
Minnie Householder
By John H. Weir Atty

ANDREW B. GRAHAM CO., PHOTO-LITHOGRAPHERS, WASHINGTON, D. C.

UNITED STATES PATENT OFFICE.

MINNIE HOUSHOLDER, OF CHICAGO, ILLINOIS.

LAVATORY OR SHAMPOOING BOWL.

No. 12,386. Specification of Reissued Letters Patent. Reissued Aug. 29, 1905.

Original No. 758,447, dated April 26, 1904. Application for reissue filed August 1, 1904. Serial No. 218,972.

*To all whom it may concern:*

Be it known that I, MINNIE HOUSHOLDER, a citizen of the United States, and a resident of Chicago, in the county of Cook and State of Illinois, have invented a new and useful Improvement in Lavatory or Shampooing Bowls, of which the following is a description.

My invention relates to an improvement in lavatory or shampooing bowls by the use of which the rinsing of the hair after a shampoo may be done without causing pain or discomfort to the customer, as will be herein explained.

It is well known that the operation of rinsing the soap from the hair after a shampoo is conducted in ladies' hair-dressing parlors by seating the person in front of a stationary bowl or basin having the usual top slab surrounding the same and holding the head over the bowl while the operator directs the water upon and through the hair. Unless the head be held entirely over the bowl (which is almost impossible) the face comes directly over the front portion of the top slab, and the weight of the head then bears upon the nose, thus causing great discomfort, and if the head be drawn back, so that the nose is not in contact with the slab, (the forehead resting thereon,) this position does not permit the head to be projected sufficiently over the bowl, the effect being that a part of the soapy water or other liquid would instead of draining into the bowl fall upon the clothing of the person, the effect of which need not be described. The chief cause of this objectionable feature of the ordinary bowl is that the distance from the bowl to the front edge of the top slab is too great, it being from two to five inches.

The object of my invention is to provide a top slab for such bowls, in which slab the distance between the front of the bowl and the front of the slab is reduced at the proper point, thereby permitting a lady to rest her forehead upon the slab at this point and at the same time permitting the head to project as far as possible over the bowl. I prefer to accomplish this result by forming in the front or adjacent edge of the slab a recess, which may be of any preferred form.

Figure 1:
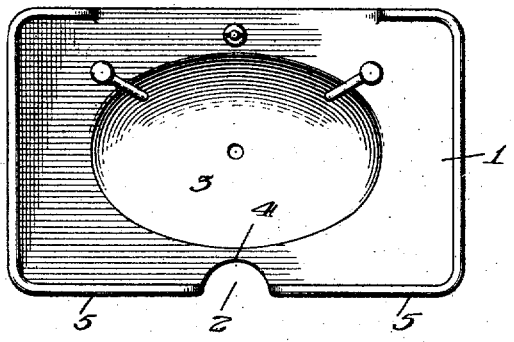
Figure 2:
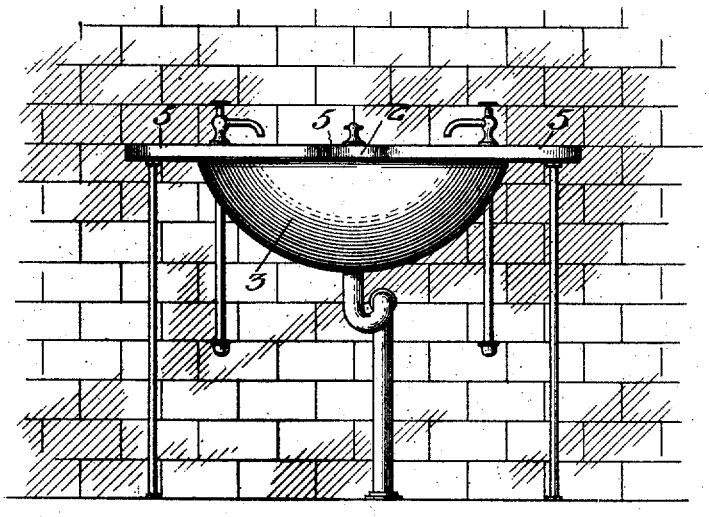
Figure 3:
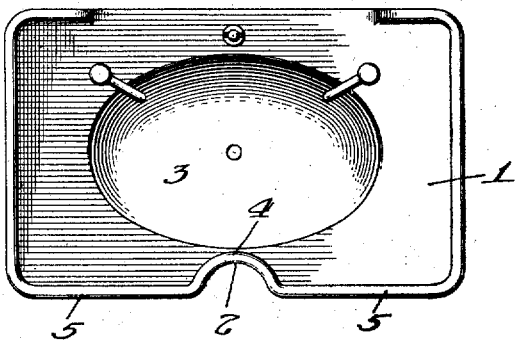

In the accompanying drawings, Figure 1 is a plan view of a top slab formed in accordance with my invention. Fig. 2 is a front elevation thereof, showing a slightly-modified embodiment. Fig. 3 is a plan view of Fig. 2.

1 designates the top slab, which is usually manufactured separately from the bowl and fitted thereto in any suitable manner. The recess 2 is preferably located substantially in front of the center of the bowl 3. As shown, the recess 2 is preferably not semicircular in form, but is slightly angular. Its innermost point is adapted to receive the upper portion of the nose when the forehead is rested upon the portion 4 intermediate the recess and the bowl. It is thus obvious that the person's head will be projected as far as practicable over the bowl, so that all of the water may be caused to drain thereinto.

5 designates the usual slightly-raised peripheral portion of the top of the slab, which serves to prevent water from running over its edge. This peripheral raised portion may terminate at the sides of the recess and be omitted around the margin of the recess 2, as shown in the preferred form in Fig. 1, or it may be extended around the margin of the recess, as in the modification shown in Figs. 2 and 3.

While I have described the preferred embodiment of my invention, I do not wish to be understood as limiting myself to the exact form and construction described and shown herein.

Having thus described my invention, what I claim as new, and desire to secure by Letters Patent, is—

1. A slab of the character described for washstands, the same having an enlarged opening therein, the edge portion of the slab surrounding said opening being arranged to overlie the upper edge of a bowl, and the side and front edges of the slab having a peripheral portion extending upwardly therefrom, the forward portion of the slab centrally of the opening therein being recessed from its forward edge to a point relatively close to the edge thereof surrounding said opening, and the peripheral upwardly-extending portion of the slab terminating at said recess whereby a smooth flat resting-surface is provided for the forehead of a user, the recess affording space for the reception of the face of the user.

2. A slab of the character described for washstands, the same having an enlarged opening therein, the edge portion of the slab surrounding said opening when the slab is in place extending in a substantially horizontal plane and being arranged to overlie the upper edge of the bowl, and the side and front edges of the slab having a peripheral portion extending upwardly therefrom, the forward portion of the slab centrally of the opening therein being recessed from its forward edge to a point relatively close to the edge thereof surrounding said opening, and affording space for the reception of the face of the user.

In testimony whereof I have hereunto signed my name in the presence of two subscribing witnesses.

MINNIE HOUSHOLDER.

Witnesses:

ROY W. HILL,

CHARLES I. COBB.